United States Patent Office 3,468,667
Patented Sept. 23, 1969

3,468,667
COATED DUST FREE PHOSPHATE FEED SUPPLEMENT
Scott S. Chandler, Glenview, and Charles L. Ray, Wheaton, Ill., assignors, by mesne assignments, to Armour Industrial Chemical Company, a corporation of Delaware
No Drawing. Filed Mar. 19, 1965, Ser. No. 441,343
Int. Cl. A23k 1/175
U.S. Cl. 99—2        6 Claims

ABSTRACT OF THE DISCLOSURE

An animal feed supplement for providing anti-dusting properties comprising a nutritionally effective phosphatic substance of either dicalcium orthophosphate, diammonium orthophosphate, ammonium dihydrogen phosphate, or mixture thereof and a liquid coating composition including glyceryl lactopalmitate, a fatty acid or grade fatty acid salt and a oily liquid vehicle for binding said phosphatic substances.

---

This invention relates generally to mineral supplements for use in animal feeding and more particularly to the problem of dust control in the production and packaging of animal feed supplements.

Animal nutritionists have long recognized the value of including a mineral supplement in feed rations, and precipitated bone has been used in the past as a source of both calcium and phosphorus. However, dicalcium orthophosphate as precipitated bone is a by-product of the manufacture of animal glue and has been in short supply for a number of years. As a result, considerable effort has been devoted more recently to processes for extracting fluorine from phosphate rock in order to develop a more extensive source of ingestible dicalcium phosphate. An increase in the concern over dust problems has been associated with the development of practical methods of producing feed grade dicalcium phosphate from mineral rather than animal materials. The requirement that any dust control agent for admixture with the mineral supplement be safely ingestible has seriously limited the number of potentially useful substances, and an entirely satisfactory and acceptable product has not been available heretofore.

Accordingly, an important object of the present invention is to provide a safely ingestible composition for use in controlling dust in the manufacture and use of animal feed supplements.

A more general object of the invention is to provide a new and improved composition for use in producing a dust-free animal feed product.

Another object of the invention is to provide a dust controlling coating composition which has no adverse effect on the digestability of the substrate feed substance.

Still another object of the invention is to provide a dust controlling coating composition which is easy to apply to a substrate feed substance.

A further object of the invention is to provide a substantially dust-free animal feed supplement.

These and other objects and features of the invention will become more apparent from a consideration of the following descriptions.

The composition of the invention is a mixture of one or more food grade straight chain aliphatic fatty acids or their salts, glyceryl lactopalmitate in a surface-active effective amount and an unctuous, safely ingestible liquid vehicle. This composition exists in the liquid state at ordinary ambient temperatures and is readily mixed with a particulate mineral nutrient containing a pulverulent fraction in order to agglomerate and bind the minutiae of the pulverulent fraction to each other and to the remaining, larger fragments. A substantially dust-free, animal feed supplement results.

Many dust control agents have been employed heretofore with mineral fertilizers. These prior art dust controlling materials rather uniformly present toxicity problems and, hence, are unsuitable for use with feed supplement minerals. On the other hand, the composition of the invention incorporates food grade materials exclusively. The dust controlling composition of the invention also prevents the development of further amounts of dust after addition to a particulate substrate originally comprising a pulverulent fraction, specifically by lubricating the individual particles whereby to permit them to flow freely over each other without abrasive action during the customary materials handling operations. Ordinarily, when the particles of the mineral supplement have not been coated in compliance with the invention, self-grinding occurs during mixing, sizing, drying and product transfer operations. Furthermore, the dust controlling composition of the invention binds any dust already present at the time of its addition to the mineral supplement. The fatty acid material and the unctuous vehicle combine to develop an attracting coating on the coarser particles of the substrate, and the fines or dusts adhere to the coated, coarser particles. Some agglomeration of the fines also tends to occur.

The dust controlling composition of the invention is produced by simply mixing the fatty acid material and the glyceryl lactopalmitate spreading agent into the unctuous vehicle; and in the composition, the fatty acid material acts as a dust binding agent. Liquid fatty acids are preferred; and therefore, the fatty acid is selected to be a straight chain aliphatic fatty acid containing from 12 to 18 carbon atoms. The fatty acids of this character which have been processed for food uses are to be employed. The fatty acids of commerce are produced by the hydrolysis of such naturally occurring oils as tallow, soybean oil, coconut oil, and cottonseed oil; and the fatty acids of commerce are customarily mixtures of various fatty acids, including both saturated and unsaturated compounds. Such fatty acids mixtures usually include a predominant compound which gives the mixture certain distinguishing characteristics. One such commercial product which has proved to be particularly useful in the present invention is sold under the trade name Neo-Fat 94–04 Food Grade. Neo-Fat 94–04 Food Grade is a crystallized red oil having a maximum titer of 5° and containing approximately 0.5% lauric acid, 3.5% myristic acid, 0.5% pentadecylic acid, 3.0% palmitic acid, 1.0 margaric acid, a trace of stearic acid, 1.5% myristoleic acid, 6.5% palmitoleic acid, 6.5% linoleic acid, 1.0% linolenic acid, and 76% oleic acid. Various other fatty acid mixtures suitable for the invention are available under the general trade name Neo-Fat. One such additional fatty acid mixture is Neo-Fat 18-S Food Grade which is a mixture containing approximately 6% palmitic acid, 4% oleic acid and 90% stearic acid.

The fatty acids may be replaced by their corresponding alkali metal and alkaline earth metal salts. However, the metal salts of the fatty acids are restricted to those which are oil-soluble and which remain solubilized down to a temperature of approximately 40 to 50° F. Suitable fatty acid metal salts include calcium palmitate and both the sodium, calcium and potassium stearates and oleates.

In addition to a fatty acid material, the composition of the invention includes an edible spreading agent in a surface-active effective amount. A glyceryl ester, specifically glyceryl lactopalmitate, has proved to combine safe ingestibility, reasonable cost and suitable surface activity. Incorporation of glyceryl lactopalmitate in the composition of the invention prevents either the fatty acid material or the lipoidal vehicle from inhibiting digestive decomposition and absorption of the mineral supplement; and it is theorized that the glyceryl lactopalmitate aids in solubilizing or emulsifying both the fatty acid material and the unctuous vehicle for releasing the same from the mineral substrate after ingestion, thus making the mineral supplement readily available to the consuming animal.

The unctuous or lipoidal vehicle is selected to be a material which is normally liquid, safely ingestible and possessed by solvent properties toward both the glyceryl lactopalmitate and the fatty acid material employed in the composition. Furthermore, the unctuous vehicle is selected to possess a viscosity of substantially no higher than about 210 centipoises at 100° F., to have a pour point of substantially no less than about 10° F., and to have a flash point of substantially no less than about 300° F. Various liquid fatty acid glycerides, oils and oil-like substances meet these requirements. On the other hand, glycerine has proved unsuitable because of its tendency to absorb water and its general immiscibility with oily substances. Mineral oil has proved satisfactory, and a U.S.P. grade of mineral oil is selected in order to satisfy the ingestibility requirement. Among the edible, liquid fatty acid glycerides, soybean oil, corn oil and safflower oil have been successfully utilized. Propylene glycol is an example of an oil-like substance which may be employed as the unctuous vehicle in the coating composition of the invention.

Under those circumstances wherein an unsaturated compound that is subject to becoming rancid is present in the composition, due to either the particular fatty acid material or the particular vehicle which has been selected, it is advantageous to include an antioxidant. Suitable food grade antioxidants include butylated hydroxyanisole, nordihydroguaiaretic acid and butylated hydroxytoluene.

The composition of the invention is prepared by simple mixing of the various ingredients; and certain advantageous proportions are selected. The glyceryl lactopalmitate spreading agent is provided in a proportion of from about 0.1% to about 50% of the composition on a weight basis. Cooperatively, the fatty acid material is present in a proportion of from about 5% to about 95% of the composition on a weight basis. The balance of the composition is comprised of the unctuous, liquid vehicle. The lower end of the aforementioned range of inclusion for the glyceryl lactopalmitate represents a surface-active effective amount, but additional quantities of this material may be incorporated as a partial substitute for equal amounts of one of the other ingredients of the composition.

The composition is applied to the particulate mineral supplement by drizzling or spraying the composition onto the dry mineral material with either simultaneous or subsequent mixing. As will be recognized, the mineral supplement will include a particulate fraction containing fairly coarse, discrete fragments as well as a pulverulent fraction containing much finer particles. In addition, the particulate substrate which is to be treated with the composition constitutes a nutritional source of phosphates and sometimes calcium; and such phosphatic substances as dicalcium orthophosphate, diammonium phosphate and ammonium dihydrogen phosphate are contemplated. Dust control of other similar materials containing a particulate and a pulverulent fraction may also be achieved by treatment with the composition of the invention. Granular caustic soda, for example, has been treated to advantage with the composition where the caustic soda is intended for uses that do not preclude the presence of a material such as the instant composition. The composition is applied to the particulate substrate at a dosage rate of from about one-half to about two pounds per ton of substrate. These dosage rates are low compared with those required when an oily substance is used alone. The surface tension effects of the spreading agent and the binding effects of the fatty acid material permit these low dosage rates. Dosage rates of about two pounds per ton are employed for more pulverulent materials and for materials having a comparatively low average particle size, average particle size being a measure of the total surface area to be covered by the composition. Application of the composition has been found to produce no appreciable adverse effect on the free-flowing character of the product. In addition, some stabilizing effect on diammonium phosphate is achieved by the composition, the coating composition of the invention apparently reducing the loss of free ammonia from the latter material.

In order to describe the invention more fully, the following specific examples are given without, however, limiting the invention to the precise details set forth.

EXAMPLE I

| | Pounds |
|---|---|
| Glyceryl lactopalmitate | 1 |
| Mineral oil, U.S.P. | 59 |
| Neo-Fat 94–04 Food Grade (76% oleic acid) | 40 |

The composition of Example I has been used successfully to treat 100 tons of granular dicalcium orthophosphate to produce a substantially dust-free, poultry feed supplement.

EXAMPLE II

| | Pounds |
|---|---|
| Glyceryl lactopalmitate | ½ |
| Soybean oil | 64½ |
| Sodium stearate, commercial | 35 |

The composition of Example II has been used to treat 150 tons of granular diammonium orthophosphate for producing a substantially dust-free cattle feed supplement. The resulting product presented no hazard of producing scours due to the substitution of soybean oil for mineral oil as the unctuous vehicle.

EXAMPLE III

| | | |
|---|---|---|
| Glyceryl lactopalmitate | pounds | 30 |
| Corn oil, refined | do | 60 |
| Butylated hydroxyanisole | oz. avoir | 1 |
| Neo-Fat 18-S Food Grade (90% stearic acid) | pounds | 10 |

The composition of Example III incorporates a relatively high level of the glyceryl lactopalmitate and has been found to achieve exceptionally good coverage of a substrate mineral supplement together with a rapid release of the coating upon ingestion of the product. A comparatively low proportion of binding agent is required in the composition of Example III because of the slight thickening of the corn oil vehicle which occurs upon application to the mineral substrate and upon exposure to the atmosphere. An antioxidant is incorporated in the composition of Example III in order to preserve the corn oil vehicle from rancidity.

EXAMPLE IV

| | | |
|---|---|---|
| Glyceryl lactopalmitate | oz. avoir | 2 |
| Mineral oil, U.S.P. | pounds | 85 |
| Neo-Fat 94–04 Food Grade (76% oleic acid) | do | 15 |

The composition of Example IV is characterized by the use of a minimal amount of the glyceryl lactopalmitate spreading agent together with a correspondingly appropriate proportion of the fatty acid material used as a dust binding agent. This composition has proved appropriate for situations where maximum dust control is not required but where economy is a definite consideration.

Use of the compositions of the invention as a coating for particulate, animal feed supplement materials has been found to decrease the product loses resulting from escape of dusts. The granular dust-free appearance of products incorporating the composition of the invention results in greater eye appeal and therefore greater merchantability. Use of the composition of the invention also controls the hazards ordinarily associated with a dust generating product, for example, air pollution, explosions and fire.

The specific examples herein described should be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. A substantially dust free animal feed supplement comprising: a nutritionally effective phosphatic substance selected from the class consisting of dicalcium orthophosphate, diammonium orthophosphate, ammonium dihydrogen phosphate, and mixtures thereof, including a particulate fraction and a pulverulent fraction and a composition coating the fragments of said particulate fraction and binding the minutiae of said pulverulent fraction, said composition comprising: glyceryl lactopalmitate in a surface-active effective amount, a dust binding agent selected from the class consisting essentially of food grade straight chain aliphatic fatty acids containing from 12 to 18 carbon atoms and food grade alkali metal and alkaline earth metal salts of such acids, and an unctuous, safely ingestible liquid vehicle having solvent properties toward glyceryl lactopalmitate and toward said dust binding agent.

2. The supplement according to claim 1 wherein said vehicle is mineral oil.

3. The supplement according to claim 1 wherein said vehicle is a mixture of fatty acid glycerides.

4. The supplement composition according to claim 1 wherein said vehicle comprises an unsaturated fatty acid glyceride and an antioxidant.

5. The supplement according to claim 1 wherein said dust binding agent includes an unsaturated compound subject to becoming rancid and wherein said composition further comprises a food grade antioxidant.

6. A supplement according to claim 1 wherein said unctuous, safely ingestible, liquid vehicle has a viscosity of substantially no higher than about 210 centipoises at 100° F., having a pour point of substantially no less than about 10° F., having a flash point of substantially no less than about 300° F., and has solvent properties toward glyceryl lactopalmitate and toward said dust binding agent.

References Cited

UNITED STATES PATENTS

| | | |
|---|---|---|
| 2,346,072 | 4/1944 | Haskell et al. |
| 2,855,306 | 10/1958 | Rosenberg. |
| 2,957,932 | 10/1960 | Radlove et al. |
| 3,051,572 | 8/1962 | Tribble _____ 99—2 |

OTHER REFERENCES

Gillis et al.: J. Nutrition, 78, pp. 155–56, October 1962.

LIONEL M. SHAPIRO, Primary Examiner

NORMAN ROSKIN, Assistant Examiner

U.S. Cl. X.R.

99—2